United States Patent [19]

Kobus

[11] Patent Number: 4,586,341

[45] Date of Patent: May 6, 1986

[54] TWIN ENGINE SYNCHRONIZER

[76] Inventor: John R. Kobus, 714 Pennington St., Elizabeth, N.J. 07202

[21] Appl. No.: 492,735

[22] Filed: May 9, 1983

[51] Int. Cl.⁴ ............................................. F02B 73/00
[52] U.S. Cl. ....................................... 60/711; 60/702; 74/89.15; 74/501 R; 74/625
[58] Field of Search ............... 60/698, 700, 701, 702, 60/711, 716; 74/89.15, 501 R, 625

[56] References Cited

U.S. PATENT DOCUMENTS

| | | | |
|---|---|---|---|
| 2,314,610 | 3/1943 | Day | 60/702 X |
| 3,258,927 | 7/1966 | Herbert | 60/700 |
| 3,309,871 | 3/1967 | Kelly | 60/97 |
| 3,367,110 | 2/1968 | Leeson, Jr. | 60/702 |
| 3,986,363 | 10/1976 | Beaman et al. | 60/702 X |
| 4,435,961 | 3/1984 | Stewart | 60/698 X |

Primary Examiner—Stephen F. Husar
Attorney, Agent, or Firm—Lerner, David, Littenberg, Krumholz & Mentlik

[57] ABSTRACT

Disclosed herein are apparatus and methods for synchronizing the speeds of two or more engines, each having its own throttle lever connected by an associated cable to a respective hand throttle lever. More particularly, the throttle lever of one of the engines is moved independently of its associated cable and its respective hand throttle lever to increase or decrease the speed of the engine until its speed matches the speed of the other engine or engines, whereby the speeds of the engines may be synchronized without moving their associated cables or their respective hand throttle levers.

37 Claims, 10 Drawing Figures

TWIN ENGINE SYNCHRONIZER

FIELD OF THE INVENTION

The present invention relates to a method and apparatus for automatically synchronizing the speeds of a plurality of engines, such as two marine or aircraft engines, and, more particularly, to such a method and apparatus especially adapted to synchronize the speeds of gasoline or diesel engines controlled by separate hand throttle levers, each of which is connected to a respective engine by an associated control cable, such as a conventional push-pull cable.

BACKGROUND OF THE INVENTION

Devices have been proposed for synchronizing the speeds of two or more engines, each of which is controlled by a hand throttle lever acting through an associated cable, linkage or other similar means on a throttle lever of the engine. Typically, these prior devices adjust the speed of one engine (commonly referred to as the "slave engine") by moving the throttle lever associated therewith until the speed of the slave engine substantially matches the speed of the other engine (commonly referred to as the "master engine").

Generally, the prior synchronizing devices adjust the speed of the slave engine by moving the throttle lever associated with the slave engine. In addition to moving the throttle lever of the slave engine, many of these devices also move the hand throttle lever associated with the slave engine (see, for instance, U.S. Pat. Nos. 3,258,927 and 2,339,989). These devices are disadvantageous because they must generate sufficient force to overcome not only the friction of the throttle lever but also the friction of the hand throttle lever and the cable or linkage connecting the hand throttle lever to the throttle lever.

In other of the prior synchronizing devices, apparent attempts have been made to synchronize the speed of the slave engine with the speed of the master engine without having to move the hand throttle lever associated with the slave engine. Some of these devices require the modification of the cable which connects the hand throttle lever of the slave engine to the throttle lever on the slave engine (see, for instance, U.S. Pat. Nos. 3,367,110 and 3,309,871). In particular, these synchronizing devices are interposed intermediate the ends of the linkage or cable connecting the hand throttle lever to the throttle lever, thereby requiring additional mounting hardware and space. In Beaman et al. U.S. Pat. No. 3,986,363, there is disclosed an engine synchronizer which may be installed without replacing or modifying a conventional Bowden cable or similar throttle control cable used to couple the throttle lever of the slave engine to its associated hand throttle lever. However, the device disclosed in the Beaman et. al. patent adjusts the position of the throttle lever of the slave engine by moving the control cable associated therewith. One problem associated with such a device is that it requires a certain amount of free space to accommodate movement of the control cable. Another disadvantage is that the stiffness of the control cable may result in erractic movement of the synchronizer.

SUMMARY OF THE PRESENT INVENTION

The present invention relates to new and improved apparatus and methods for synchronizing the speeds of two engines, each having its own throttle lever connected by an associated cable to a respective hand throttle lever. In accordance with the improvement of the present invention, the throttle lever of one of the engines (the slave engine) is moved independently of its associated cable and its respective hand throttle lever to increase or decrease the speed of the slave engine until the speed of the slave engine matches the speed of the other engine (the master engine). Because the throttle lever of the slave engine can be moved to adjust the speed of the slave engine without moving the cable or the hand throttle lever associated with the slave engine, the present invention overcomes the problems and disadvantages of the prior synchronizing devices described above.

The present invention permits the throttle lever of the slave engine to be moved by its respective hand throttle lever or independently of the hand throttle lever. Thus, the hand throttle lever of the slave engine can be used to make rough adjustments in the speed of the slave engine, while fine adjustments in the speed of the slave engine can be made by moving the throttle lever of the slave engine independently of its respective hand throttle lever. When the throttle lever is moved independently of the hand throttle lever to make fine adjustments in the speed of the slave engine, the throttle lever moves a relatively short distance during such adjustments. Thus, in the event of synchronizer failure due to motor or actuator malfunction, the throttle lever can still be moved to an off position or a safe operating position by the hand throttle lever, thereby providing a safety feature.

In one embodiment of the present invention, a synchronizing device is mounted between the throttle lever and an adjacent end of its associated control cable, so that the throttle lever can be moved directly by the synchronizing device. By moving the throttle lever of the slave engine independently of its associated control cable and its respective hand throttle lever, the force required to move the throttle lever to achieve synchronization is relatively low because there is no need to overcome the friction of the control cable and/or the hand throttle lever, thereby permitting a compact design of the synchronizing device as well as its smooth operation. Moreover, such mounting of the synchronizing device permits it to replace a conventional right angle ball joint connector or similar device which would normally be interposed between the throttle lever and the adjacent end of the control cable, whereby little or no additional space is required to accommodate the synchronizing device and few, if any, modifications are required in the throttle lever and its associated control cable.

BRIEF DESCRIPTION OF THE DRAWINGS

For a better understanding of the present invention, reference is made to the following detailed description of several exemplary embodiments considered in conjunction with the accompanying drawings, in which.

DESCRIPTION OF THE EXEMPLARY EMBODIMENTS

Figure 1:
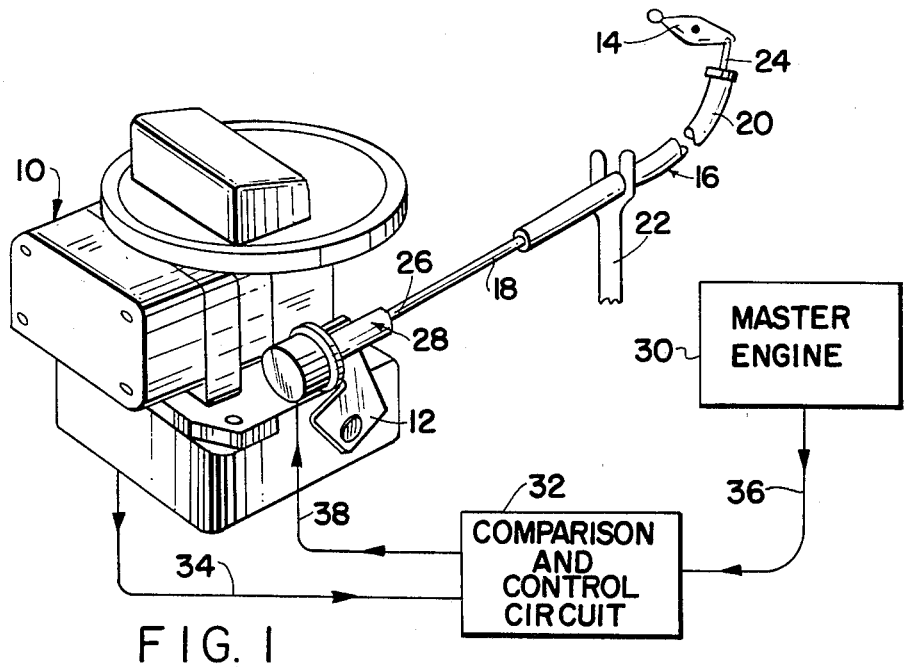
FIG. 1 is a schematic illustration of a first exemplary embodiment of a synchronizing apparatus constructed in accordance with the present invention.

Referring to FIG. 1, there is shown a slave engine 10 equipped with a pivotable throttle lever 12, which is connected to a hand throttle lever 14 by a control cable 16, such as a conventional push-pull cable. The control cable 16 includes an internal wire 18 and an outer sheath 20, which is fixedly positioned by a support arm 22 such that the wire 18 slides longitudinally within the sheath 20. The wire 18 is connected at opposite ends 24, 26 to the hand throttle lever 14 and a synchronizing device 28, which is carried by the throttle lever 12 in a manner to be described in greater detail hereinafter. The synchronizing device 28 attaches the control cable 16 to the throttle lever 12 such that the pivotal movement of the hand throttle lever 14 in a counterclockwise direction causes the throttle lever 12 to pivot in a clockwise direction to thereby increase the speed of the slave engine 10 in direct proportion to the amount of pivotal movement of the hand throttle lever 14 and hence the throttle lever 12. Conversely, the pivotal movement of the hand throttle lever 14 in a clockwise direction causes the throttle lever 12 to pivot in a counterclockwise direction to thereby decrease the speed of the slave engine 10 in direct proportion to the amount of pivotal movement of the hand throttle lever 14 and hence the throttle lever 12.

Also shown in FIG. 1 is a master engine 30 which is essentially identical to the slave engine 10 except that the master engine 30 is not equipped with a synchronizing device. Thus, like the slave engine 10, the master engine 30 has a throttle lever (not shown) which is connected to a hand throttle lever (not shown) by a control cable (not shown), such as a conventional push-pull cable.

Referring still to FIG. 1, a comparison and control circuit 32, which can be an analog or digital type, is connected between the slave engine 10 and the master engine 30. More particularly, the comparison and control circuit 32 is connected to the slave engine 10 by a lead 34, which provides the comparison and control circuit 32 with signals representative of the speed of the slave engine 10, such signals being derived, for instance, from the ignition pulse of the engine, a magnetic pulse generating device or a photoelectric sensor. Similarly, the comparison and control circuit 32 is connected to the master engine 30 by a lead 36, which provides the comparison and control circuit 32 with signals representative of the speed of the master engine 30, such signals being derived, for instance, from the ignition pulse of the engine, a magnetic pulse generating device or a photoelectric sensor. The comparison and control circuit 32 is designed to compare the signals received from the slave engine 10 and the master engine 30 through the leads 34, 36, respectively, and to detect any difference between the speeds of the slave engine 10 and the master engine 30. After detecting a difference in the speeds of the slave engine 10 and the master engine 30, the comparison and control circuit 32 sends signals to the synchronizing device 28 through a lead 38 so as to automatically control the operation of the synchronizing device 28 in response to the detected difference in the speeds of the slave engine 10 and the master engine 30.

Figure 2:
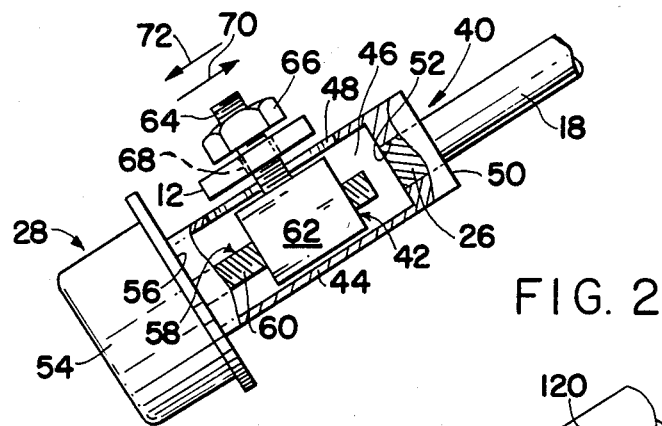
FIG. 2 is a partial cross-sectional view of the synchronizing apparatus illustrated in FIG. 1.

With reference now to FIG. 2, the synchronizing device 28, which is actually carried by the throttle lever 12, includes a first subassembly 40 and a second subassembly 42. The first subassembly 40 includes a cylindrical housing 44 having an interior chamber 46 and an exterior slot 48, which communicates with the interior chamber 46. One end 50 of the housing 44 is provided with an opening 52 sized and shaped to receive the end 26 of the wire 18 in such a manner that the control cable 16 is fixedly attached to the housing 44 for conjoint movement therewith. A motor 54 is mounted on an opposite end 56 of the housing 44. The motor 54 has a rotatable output shaft 58 which extends into the interior chamber 46 of the housing 44. External threads 60 are provided on the output shaft 58 for a purpose to be described hereinafter.

The second subassembly 42 includes a slide 62 mounted for longitudinal reciprocating movement within the chamber 46 of the housing 44. A bolt 64 extends from the slide 62 to the throttle lever 12 through the slot 48 in the housing 44. The bolt 64, which is maintained on the throttle lever 12 by a nut 66, extends loosely through a hole 68 in the throttle lever 12 so as to permit slight pivoting of the throttle lever 12 relative to the bolt 64. The slide 62 is provided with a bore 70 having internal threads (not shown), which threadedly engage the external threads 60 on the output shaft 58 of the motor 54 such that the slide 62 moves in the linear direction 72 in response to the rotation of the output shaft 58 in a counterclockwise direction and in an opposite linear direction 74 in response to the rotation of the output shaft 58 in a clockwise direction. Because the slide 62 is attached to the throttle lever 12, the linear movement of the slide 62 in the direction 72 causes the throttle lever 12 to pivot in a clockwise direction, thereby automatically increasing the speed of the slave engine 10 in direct proportion to the amount of pivotal movement of the throttle lever 12. Conversely, the linear movement of the slide 62 in the direction 74 causes the throttle lever 12 to pivot in a counterclockwise direction, thereby automatically decreasing the speed of the slave engine 10 in direct proportion to the amount of pivotal movement of the throttle lever 12. Because the force required to move the throttle lever 12 is much less than the force required to move the control cable 16, the rotation of the output shaft 58 of the motor 54 causes the slide 62, rather than the housing 44, to move. During the movement of the slide 62, the housing 44 remains stationary so that adjustments in the speed of the slave engine 10 can be made without moving the control cable 16 or the hand throttle lever 14.

The direction of rotation of the output shaft 58 of the motor 54 is controlled by the comparison and control circuit 32 depending upon the difference, if any, between the speeds of the slave engine 10 and the master engine 30. If, on the one hand, the speed of the slave engine 10 is less than the speed of the master engine 30, the comparison and control circuit 32 causes the output shaft 58 of the motor 54 to rotate in a counterclockwise direction, resulting in the movement of the slide 62 in the direction 72 and hence the clockwise pivotal movement of the throttle lever 12 to thereby increase the speed of the slave engine 10 until the speed of the slave engine 10 matches the speed of the master engine 30. When the speed of the slave engine 10 matches the speed of the master engine 30, the comparison and control circuit 32 stops the motor 54. If, on the other hand, the speed of the slave engine 10 is greater than the speed of the master engine 30, the comparison and control circuit 32 causes the output shaft 58 of the motor 54 to rotate in a clockwise direction, resulting in the movement of the slide 62 in the direction 74 and hence the counterclockwise pivotal movement of the throttle lever 12 to thereby decrease the speed of the slave engine 10 until the speed of the slave engine 10 matches the speed of the master engine 30. When the speed of the slave engine 10 matches the speed of the master engine 30, the comparison and control circuit 32 stops the motor 54.

As indicated above, the synchronizing device 28 attaches the control cable 16 to the throttle lever 12 such that the pivotal movement of the hand throttle lever 14 in a counterclockwise direction causes the throttle lever 12 to pivot in a clockwise direction, thereby increasing the speed of the slave engine 10 in direct proportion to the amount of pivotal movement of the hand throttle lever 14 and hence the throttle lever 12. Conversely, the pivotal movement of the hand throttle lever 14 in a clockwise direction causes the throttle lever 12 to pivot in a counterclockwise direction, thereby decreasing the speed of the slave engine 10 in direct proportion to the amount of pivotal movement of the hand throttle lever 14 and hence the throttle lever 12. Thus, the hand throttle lever 14 may be employed to make rough adjustments in the speed of the slave engine 10 for the purpose of synchronizing the speed of the slave engine 10 with the speed of the master engine 30, while the synchronizing device 28 may be employed to make fine adjustments in the speed of the slave engine 10 for the purpose of synchronizing the speed of the slave engine 10 with the speed of the master engine 30. Inasmuch as the synchronizing device 28 is intended primarily to make fine adjustments in the speed of the slave engine 10, the fact that the synchronizing device 28 translates the linear movement of the slide 62 into the pivotal movement of the throttle lever 12 does not have a deleterious affect on the operation of the synchronizing device 28.

Instead of the rotatable output shaft 58, the motor 54 could be provided with a linearly movable output shaft. If such a modification were made in the motor 54, the slide 62 would be controlled in response to the linear movement of the output shaft. More particularly, upon the extension of the output shaft, the slide 62 would move in the direction 72, thereby pivoting the throttle lever 12 in a clockwise direction to increase the speed of the slave engine 10. Conversely, upon the retraction of the output shaft, the slide 62 would move in the direction 74, thereby pivoting the throttle lever 12 in a counterclockwise direction to decrease the speed of the slave engine 10.

Other exemplary embodiments of the present invention are illustrated in FIGS. 3-10. The various elements illustrated in FIGS. 3-10 which correspond to elements described above with respect to the embodiment illustrated in FIGS. 1 and 2 are designated by corresponding reference numerals incresed by one hundred, two hundred, three hundred, four hundred, five hundred, six hundred, seven hundred, and eight hundred, respectively. All additional elements illustrated in FIGS. 3-10 which do not correspond to elements described above with respect to FIGS. 1 and 2 are designated by odd reference numerals. The various additional elements illustrated in FIGS. 3-10 which correspond to previously described additional elements are designated by odd reference numerals increased by an appropriate factor of one hundred. Unless otherwise stated, the embodiments of FIGS. 3-10 operate in the same manner as the embodiment of FIGS. 1 and 2.

Figure 3:
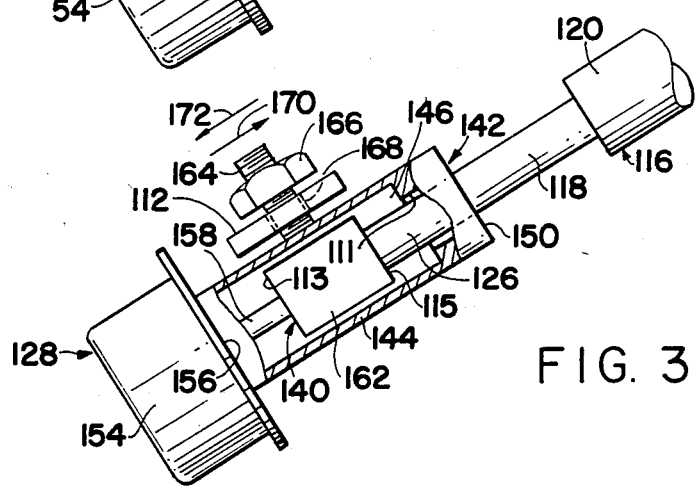
FIG. 3 is a partial cross-sectional view of a second exemplary embodiment of a synchronizing apparatus constructed in accordance with the present invention, the embodiment being a modification of the embodiment illustrated in FIGS. 1 and 2.

With reference to FIG. 3, a synchronizing device 128 for synchronizing the speed of a slave engine (not shown) to the speed of a master engine (not shown) is illustrated. The synchronizing device 128 includes a first subassembly 140 and a second subassembly 142.

The second subassembly 142 includes a housing 144 having an internal chamber 146 and an opening 111 in one end 150 of the housing 144. The opening 111 is sized such that an end 126 of a wire 118 of a control cable 116 extends therethrough. A motor 154 is mounted on an opposite end 156 of the housing 144. The motor 154 has a linearly movable output shaft 158, which extends into the chamber 146 of the housing 144. A bolt 164 extends from the housing 144 through a hole 168 in a throttle lever 112 of the slave engine (not shown). The bolt 164 is maintained on the throttle lever 112 by a nut 166.

The first subassembly 140 includes a slide 162 mounted in the chamber 146 of the housing 144. The output shaft 158 of the motor 154 is fixedly attached to one end 113 of the slide 162. The wire 118 is fixedly attached to an opposite end 115 of the slide 162. Because the force required to move the throttle lever 112 is much less than the force required to move the control cable 116, the movement of the output shaft 158 of the motor 154 causes the housing 144, rather than the slide 162, to move. Thus, the housing 144 moves in a linear direction 170 in response to the extension of the output shaft 158 of the motor 154, whereby the throttle lever 112 is rotated in a clockwise direction to increase the speed of the slave engine (not shown). Conversely, the housing 144 moves in an opposite linear direction 172 in response to the retraction of the output shaft 158, whereby the throttle lever 112 is rotated in a counterclockwise direction to decrease the speed of the slave engine (not shown)

Instead of the linearly movable output shaft 158, the motor 154 could be provided with a rotatable output shaft. If such a modification were made in the motor 154, an internally threaded slide would be provided so that the movement of the housing 144 would be controlled in response to the rotation of the output shaft of the motor 154.

Figure 4:
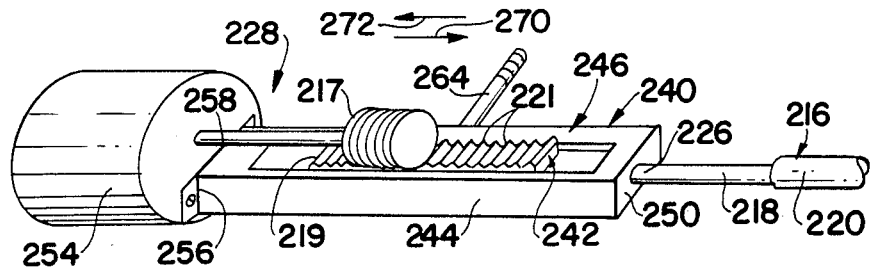
FIG. 4 is a schematic illustration of a third exemplary embodiment of a synchronizing apparatus constructed in accordance with the present invention.

In FIG. 4, there is shown a synchronizing device 228 for synchronizing the speed of a slave engine (not shown) to the speed of a master engine (not shown). The synchronizing device 228 includes a first subassembly 240 and a second subassembly 242.

The first subassembly 240 includes a housing 244 having an interior chamber 246 and a slot (not shown) which communicates with the interior chamber 246. One end 250 of the housing 244 receives an end 226 of a wire 218 in such a manner that a control cable 216 is fixedly attached to the housing 244. A motor 254 is mounted on an opposite end 256 of the housing 244. The motor 254 has a rotatable output shaft 258, which extends into the chamber 246 of the housing 244. A worm gear 217 is attached to the output shaft 258 of the motor 254 for conjoint rotation therewith.

The second subassembly 242 includes a rack 219 and a bolt 264, which extends from the rack 219 to a throttle lever (not shown) of a slave engine (not shown) through the slot (not shown) in the housing 244. The rack 219 is provided with teeth 221 designed so as to mesh with the worm gear 217 such that the rack 219 moves in a linear direction 270 in response to the rotation of the output shaft 258 in a counterclockwise direction and in an opposite linear direction 272 in response to the rotation of the output shaft 258 in a clockwise direction.

Figure 5:
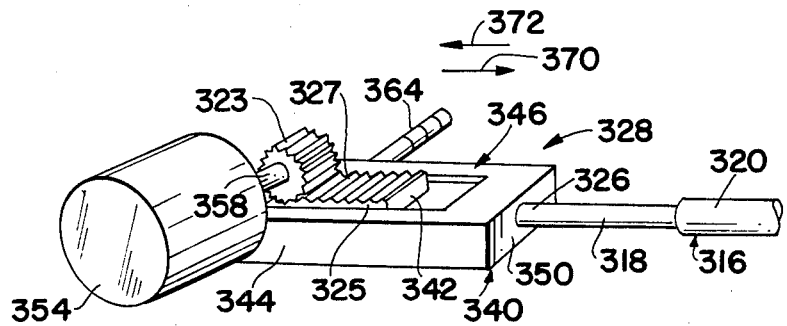
FIG. 5 is a schematic illustration of a fourth exemplary embodiment of a synchronizing apparatus constructed in accordance with the present invention, this embodiment being a modification of the embodiment illustrated in FIG. 4.

With reference to FIG. 5, there is shown a synchronizing device 328 for synchronizing the speed of a slave engine (not shown) to the speed of a master engine (not shown). The synchronizing device 328 includes a first subassembly 340 and a second subassembly 342.

The first subassembly 340 includes a housing 344 having an interior chamber 346 and a slot (not shown) which communicates with the interior chamber 346. One end 350 of the housing 344 receives an end 326 of a wire 318 in such a manner that a control cable 316 is fixedly attached to the housing 344. A motor 354 is mounted alongside an opposite end (not shown) of the housing 344. The motor 354 has a rotatable output shaft 358, which extends into the chamber 346 of the housing 344. A spur gear 323 is attached to the output shaft 358 of the motor 354 for conjoint rotation therewith.

The second subassembly 342 includes a rack 325 and a bolt 364, which extends from the rack 325 to a throttle lever (not shown) of a slave engine (not shown) through the slot (not shown) in the housing 344. The rack 325 is provided with teeth 327 designed so as to mesh with the spur gear 323 such that the rack 325 moves in a linear direction 370 in response to the rotation of the output shaft 358 in a counterclockwise direction and in an opposite linear direction 372 in response to the rotation of the output shaft 358 in a counterclockwise direction.

Figure 6:
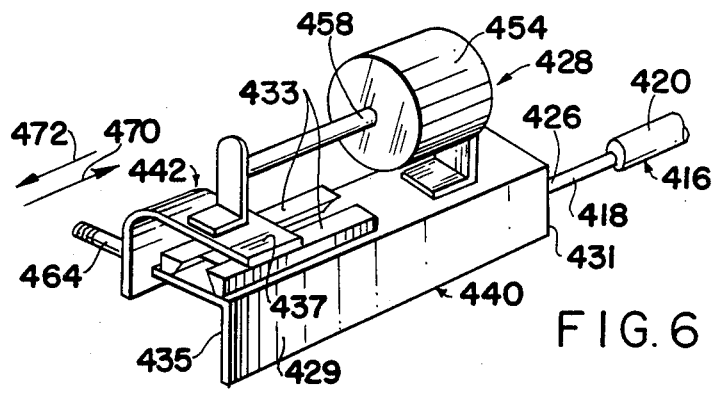
FIG. 6 is a schematic illustration of a fifth exemplary embodiment of a synchronizing apparatus constructed in accordance with the present invention.

Referring to FIG. 6, there is shown a synchronizing device 428 for synchronizing the speed of a slave engine (not shown) to the speed of a master engine (not shown). The synchronizing device 428 includes a first subassembly 440 and a second subassembly 442.

The first subassembly 440 includes a platform 429. An end 426 of a wire 418 is attached to one end 431 of the platform 429 in such a manner that a control cable 416 is fixedly attached to the platform 429. A pair of tracks 433 is mounted on an opposite end 435 of the platform 429. A motor 454, having a linearly movable output shaft 458, is also mounted on the platform 429.

The second subassembly 442 includes a slide 437, which is mounted for reciprocating movement over the tracks 433, and a bolt 464 extending from the slide 437 to a throttle lever (not shown) on the slave engine (not shown). The slide 437 is fixedly attached to the output shaft 458 of the motor 454 such that the linear movement of the output shaft 458 causes a corresponding linear movement of the slide 437 along the tracks 433. Thus, the slide 437 moves in a linear direction 470 in response to the retraction of the output shaft 458. Conversely, the slide 437 moves in an opposite linear direction 472 in response to the extension of the output shaft 458.

Figure 7:
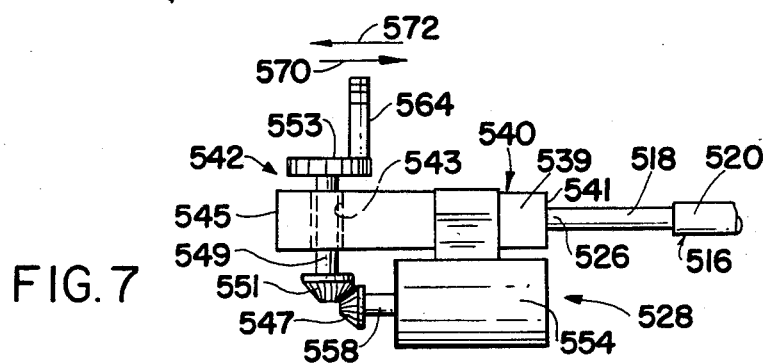
FIG. 7 is a schematic illustration of a sixth exemplary embodiment of a synchronizing apparatus constructed in accordance with the present invention.

In FIG. 7, there is shown a synchronizing device 528 for synchronizing the speed of a slave engine (not shown) with the speed of a master engine (not shown). The synchronizing device 528 includes a first subassembly 540 and a second subassembly 542.

The first subassembly 540 includes a mounting block 539. An end 526 of a wire 518 is attached to one end 541 of the mounting block 529 in such a manner that a control cable 516 is fixedly attached to the mounting block 539. A hole 543 extends through an opposite end 545 of the mounting block 539. A motor 554, having a rotatable output shaft 558, is mounted on the mounting block 539. The shaft 558 carries a bevel gear 547.

The second subassembly 542 includes a rotatable axle 549 which extends through the hole 543 in the mounting block 539. The axle 549 carries a bevel gear 551, which meshes with the bevel gear 547 such that rotation of the output shaft 558 in a clockwise direction causes the axle 549 to rotate in a counterclockwise direction, while the rotation of the output shaft 558 in a counterclockwise direction causes the axle 549 to rotate in a clockwise direction. A plate 553 is also carried by the axle 549. The plate 553 is provided with an eccentrically mounted bolt 564, which extends to a throttle lever (not shown) on the slave engine (not shown). By this arrangement, the plate 553 and hence the bolt 564 rotate in a clockwise direction in response to the clockwise rotation of the axle 549 to thereby pivot the throttle lever (not shown) of the slave engine (not shown) in a clockwise direction for the purpose of increasing the speed of the slave engine (not shown). Conversely, the plate 553 and hence the bolt 564 rotate in a counterclockwise direction in response to the counterclockwise rotation of the axle 549 to thereby pivot the throttle lever (not shown) of the slave engine (not shown) in a counterclockwise direction for the purpose of decreasing the speed of the slave engine (not shown).

Figures 8, 9, 10:
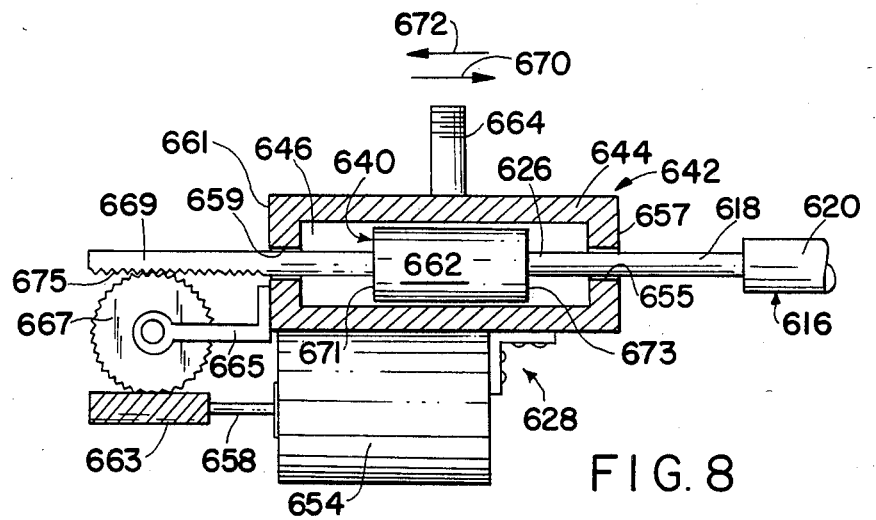
FIG. 8 is a schematic illustration of a seventh exemplary embodiment of a synchronizing apparatus constructed in accordance with the present invention.
FIG. 9 is a schematic illustration of an eighth exemplary embodiment of a synchronizing apparatus constructed in accordance with the present invention, this embodiment being a modification of the embodiment illustrated in FIG. 8.
FIG. 10 is a schematic illustration of a ninth exemplary embodiment of a synchronizing apparatus constructed in accordance with the present invention.

With reference to FIG. 8, a synchronizing device 628 for synchronizing the speed of a slave engine (not shown) to the speed of a master engine (not shown) is illustrated. The synchronizing device 628 includes a first subassembly 640 and a second subassembly 642.

The second subassembly 642 includes a housing 644 having an interior chamber 646, an opening 655 in one end 657 of the housing 644 and an opening 659 in an opposite end 661 of the housing 644. The opening 655 is sized and shaped such that an end 626 of a wire 618 of a control cable 616 extends therethrough. A motor 654, having a rotatable output shaft 658 provided with a worm 663, is mounted on the housing 644 along with a bracket 665, which carries a rotatable worm wheel 667 such that the worm wheel 667 meshes with the worm 663. A bolt 664, which extends from the housing 644, is attached to a throttle lever (not shown) on the slave engine (not shown).

The first subassembly 640 includes a slide 662 mounted in the chamber 646 of the housing 644. A rack 669 is attached to one end 671 of the slide 662, while the wire 618 is fixedly attached to an opposite end 673 of the slide 662. The rack 669, which extends through the opening 659 in the housing 644, includes teeth 675, which mesh with the worm wheel 667. Upon rotation of the output shaft 658 and hence the worm 663 in a counterclockwise direction, the worm wheel 667 rotates in a clockwise direction and moves in a linear direction 670 along with the housing 644. Conversely, upon rotation of the output shaft 658 and hence the worm 663 in a clockwise direction, the worm wheel 667 rotates in a counterclockwise direction and moves in a linear direction 672 along with the housing 644.

In FIG. 9, there is shown a synchronizing device 728 for synchronizing the speed of a slave engine (not shown) to the speed of a master engine (not shown). The synchronizing device 728 includes a first subassembly 740 and a second subassembly 742.

The second subassembly 742 includes a housing 744 having an interior chamber 746, an opening 755 in one end 757 of the housing 744 and an opening 759 in an opposite end 761 of the housing 744. The opening 755 is sized and shaped such that an end 726 of a wire 718 of a control cable 716 extends therethrough. A motor 754, having a linearly movable output shaft 758, is mounted on the housing 744 along with a bracket 765, which carries a pivotable lever 777. The lever 777 is attached to the output shaft 758 of the motor 754 on one side of the bracket 765. A bolt 764, which extends from the housing 744, is attached to a throttle lever (not shown) of the slave engine (not shown).

The first subassembly 740 includes a slide 762 mounted in the chamber 746 of the housing 744. A link member 779 is attached to one end 771 of the slide 762, while the wire 718 is fixedly attached to an opposite end 773 of the slide 762. The lever 777 is also pivotally attached to the link member 779 on an opposite side of the bracket 765. Upon extension of the output shaft 758, the lever 777 rotates in a clockwise direction to thereby move the link member 779 and hence the slide 762 in a first linear direction 770. Conversely, upon the retraction of the output shaft 758, the lever 777 rotates in a counterclockwise direction to thereby move the link member 779 and hence the slide 762 in an opposite linear direction 772.

Referring to FIG. 10, a synchronizing device 828 for synchronizing the speed of a slave engine (not shown) to the speed of a master engine (not shown) is shown. The synchronizing device 828 includes a first subassembly 840 and a second subassembly 842.

The second subassembly 842 includes a housing 844 having an interior chamber 846, an opening 855 in one end 857 of the housing 844 and an opening 859 in an opposite end 861 of the housing 844. The opening 855 is sized and shaped such that an end 826 of a wire 818 of a control cable 816 extends therethrough. A motor 854, having a rotatable output shaft 858 provided with a gear 881, is mounted on the housing 844 along with a bracket 883 and a bolt 864, which extends from the housing 844 to a throttle lever (not shown) on the slave engine (not shown).

The first subassembly 840 includes a slide 862 mounted in the chamber 846 of the housing 844. A member 885 having external threads 887 is fixedly attached to one end 871 of the slide 862 and extends externally of the housing 844 through the opening 859 therein. A gear 889, having internal threads (not shown) which mesh with the external threads 887 on the member 885, is carried by the member 885 between the housing 844 and the bracket 883. The gear 889 meshes with the gear 881. The wire 818 is fixedly attached to an opposite end 873 of the slide 862. Thus, upon rotation of the output shaft 858 and hence the gear 881 in a counterclockwise direction, the gear 889 rotates in a clockwise direction, thereby causing the gear 889 and hence the housing 844 to move in a linear direction 870. Conversely, upon the rotation of the output shaft 858 and hence the gear 881 in a clockwise direction, the gear 889 rotates in a counterclockwise direction, thereby causing the gear 889 and hence the housing 844 to move in an opposite linear direction 872.

It will be understood that the embodiments described herein are merely exemplary and that a person skilled in the art may make many variations and modifications without departing from the spirit and scope of the invention. For instance, the slide 62 could be equipped with a reciprocating mechanical actuator to permit the automatic reversal of its direction of travel. Also, for fail-safe operation, the motor 254 could be pivotally mounted to the housing 244 such that the worm 217 could be automatically disengaged from the rack 219, which would then be automatically returned to a neutral position by, for instance, springs mounted on either side of the rack 219. All such modifications and variations are intended to be included within the scope of the invention as defined in the appended claims.

I claim:

1. Apparatus for synchronizing the speeds of two engines, each having its own throttle lever connected by an associated cable to a respective hand throttle lever, comprising moving means carried by said throttle lever of one of said engines for moving said throttle lever of said one engine independently of its associated cable and its respective hand throttle lever to increase or decrease the speed of said one engine until the speed of said one engine matches the speed of the other engine, whereby said moving means moves said throttle lever of said one engine to adjust the speed of said one engine without moving its associated cable or its respective hand throttle lever.

2. Apparatus according to claim 1, further comprising detecting means for detecting a difference in the speeds of said engines and controlling means for controlling said moving means in response to said difference in speed detected by said detecting means.

3. Apparatus according to claim 1, further comprising attaching means for attaching said moving means to said throttle lever of said one engine and its associated cable such that the movement of said cable by its respective hand throttle lever results in a corresponding movement of said throttle lever of said one engine, whereby said hand throttle lever may be employed to make rough adjustments in the speed of said one engine for the purpose of synchronizing the speed of said one engine with the speed of said other engine and said moving means may be employed to make fine adjustments in the speed of said one engine for the purpose of synchronizing the speed of said one engine with the speed of said other engine.

4. Apparatus according to claim 1, wherein said moving means includes a first subassembly fixedly positioned relative to said throttle lever to said one engine and a second subassembly mounted for movement relative to said first subassembly and connected to said throttle lever of said one engine such that said throttle lever of said one engine moves conjointly with said second subassembly during at least a portion of the movement of said second subassembly.

5. Apparatus according to claim 4, wherein said second subassembly is mounted for linear reciprocating movement relative to said first subassembly.

6. Apparatus according to claim 5, wherein said moving means further includes a motor having a rotatable output shaft, said motor being fixedly attached to said first subassembly.

7. Apparatus according to claim 6, wherein said moving means further includes external threads provided on said output shaft of said motor and internal threads provided in said second subassembly, said internal threads threadedly engaging said external threads such that said second subassembly moves in a first linear direction in response to the rotation of said output shaft in a first rotational direction and in a second linear direction opposite to said first linear direction in response to the rotation of said output shaft in a second rotational direction.

8. Apparatus according to claim 7, wherein said first subassembly includes a housing and said second subassembly includes a slide mounted within said housing and a bolt extending through said housing to connect said slide to said throttle lever of said one engine.

9. Apparatus according to claim 8, wherein said first subassembly includes attaching means for fixedly attaching an end of said cable associated with said throttle lever of said one engine to said housing.

10. Apparatus according to claim 6, wherein said moving means further includes a gear provided on said output shaft of said motor for conjoint rotation therewith and gear teeth provided on said second subassembly, said gear teeth meshing with said gear such that said second subassembly moves in a first linear direction in response to the rotation of said output shaft in a first rotational direction and in a second linear direction opposite to said first linear direction in response to the rotation of said output shaft in a second rotational direction opposite to said first rotational direction.

11. Apparatus according to claim 10, wherein said first subassembly includes a housing and said second subassembly includes a rack mounted within said housing and a bolt extending through said housing to connect said rack to said throttle lever of said one engine.

12. Apparatus according to claim 11, wherein said first subassembly includes attaching means for fixedly attaching an end of said cable associated with said throttle lever of said one engine to said housing.

13. Apparatus according to claim 10, wherein said gear is a worm gear.

14. Apparatus according to claim 5, wherein said moving means further includes a motor having a rotatable output shaft, said motor being fixedly attached to said second subassembly.

15. Apparatus according to claim 14, wherein said moving means further includes external threads provided on said output shaft of said motor and internal threads provided in said first subassembly, said internal threads threadedly engaging said external threads such that said second subassembly moves in a first linear direction in response to the rotation of said output shaft in a first rotational direction and in a second linear direction opposite to said first linear direction in response to the rotation of said output shaft in a second rotational direction opposite to said first rotational direction.

16. Apparatus according to claim 15, wherein said second subassembly includes a housing and a bolt extending between said housing and said throttle lever of said one engine and said first subassembly includes a slide mounted within said housing, said slide being provided with said internal threads.

17. Apparatus according to claim 16, wherein said first subassembly includes attaching means for fixedly attaching an end of said cable associated with said throttle lever of said one engine to said slide.

18. Apparatus according to claim 14, wherein said moving means further includes a worm mounted on said output shaft of said motor for conjoint rotation therewith, a rack fixedly attached to said second subassembly, said rack having teeth, and a rotatable worm wheel attached to said second subassembly, said worm wheel meshing with said worm and said teeth of said rack such that said worm wheel moves said second subassembly in a first linear direction in response to the rotation of said output shaft in a first rotational direction and said worm wheel moves the second subassembly in a second linear direction opposite to said first linear direction in response to the rotation of said output shaft in a second rotational direction opposite to said first rotational direction.

19. Apparatus according to claim 18, wherein said second subassembly includes a housing and a bolt extending between said housing and said throttle lever of said one engine and said first subassembly includes a slide mounted within said housing, said rack extending from said slide externally of said housing.

20. Apparatus according to claim 19, wherein said first subassembly includes attaching means for fixedly attaching an end of said cable associated with said throttle lever of said one engine to said slide.

21. Apparatus according to claim 14, wherein said moving means further includes a first gear mounted on said output shaft of said motor for conjoint rotation therewith, an externally threaded member fixedly attached to said second subassembly, and a second gear threadedly mounted to said externally threaded member and threadedly meshing with said first gear such that said second gear moves said second subassembly in a first linear direction in response to the rotation of said output shaft in a first rotational direction and said second gear moves said second subassembly in a second linear direction opposite to said first linear direction in response to the rotation of said output shaft in a second rotational direction opposite to said first rotational direction.

22. Apparatus according to claim 21, wherein said second subassembly includes a housing, a bolt extending between said housing and said throttle lever of said one engine and a bracket carried by said housing and extending outwardly therefrom such that said second gear is positioned between said housing and said bracket and said first subassembly includes a slide mounted within said housing, said externally threaded member extending from said slide externally of said housing.

23. Apparatus according to claim 22, wherein said first subassembly includes attaching means for fixedly attaching an end of said cable associated with said throttle lever of said one engine to said slide.

24. Apparatus according to claim 5, wherein said moving means further includes a motor having a linearly movable output shaft, said motor being fixedly attached to said first subassembly.

25. Apparatus according to claim 24, wherein said first subassembly includes a track and said second subassembly includes a slide mounted on said track and a bolt extending between said slide and said throttle lever of said one engine.

26. Apparatus according to claim 25, wherein said first subassembly includes attaching means for fixedly attaching an end of said cable associated with said throttle lever of said one engine to said first subassembly.

27. Apparatus according to claim 24, wherein said first subassembly includes a housing and said second subassembly includes a slide mounted within said housing and attached to said shaft of said motor for conjoint movement therewith and a bolt extending through said housing to connect said slide to said throttle lever of said one engine.

28. Apparatus according to claim 27, wherein said first subassembly includes attaching means for fixedly attaching an end of said cable associated with said throttle lever of said one engine to said housing.

29. Apparatus according to claim 5, wherein said moving means further includes a motor having a linearly movable output shaft, said motor being fixedly attached to said second subassembly.

30. Apparatus according to claim 29, wherein said second subassembly includes a housing and a bolt extending between said housing and said throttle lever of said one engine and said first subassembly includes a slide mounted within said housing and fixedly connected to said output shaft of said motor.

31. Apparatus according to claim 30, wherein said first subassembly includes attaching means for fixedly attaching an end of said cable associated with said throttle lever of said one engine to said slide.

32. Apparatus according to claim 29, wherein said moving means further includes a link member fixedly attached to said first subassembly and a lever pivotable about a pivot point located a fixed distance from said second subassembly, said lever having a first end attached to said link member and a second end attached to said output shaft of said motor such that said lever moves said second subassembly in a first linear direction in response to the pivoting of said lever in a first rotational direction and said lever moves said second subassembly in a second linear direction opposite to said first linear direction in response to the pivoting of said lever in a second rotational direction opposite to said first rotational direction.

33. Apparatus according to claim 32, wherein said second subassembly includes a housing and said first subassembly includes a slide mounted within said housing, said link member extending externally of said housing from said slide.

34. Apparatus according to claim 33, wherein said first subassembly includes attaching means for fixedly attaching an end of said cable associated with said throttle lever of said one engine to said slide.

35. Apparatus according to claim 4, wherein said moving means further includes a motor having a rotatable output shaft and a first bevel gear mounted on said output shaft for conjoint rotation therewith, said motor being fixedly attached to said first subassembly.

36. Apparatus according to claim 35, wherein said first subassembly includes a mounting block and said second subassembly includes a rotatable axle extending through said mounting block, a second bevel gear mounted on said axle for conjoint rotation therewith, said second bevel gear meshing with said first bevel gear such that said second bevel gear rotates in response to the rotation of said first bevel gear, and a bolt eccentrically mounted on said axle, said bolt being connected to said throttle lever of said one engine.

37. Apparatus according to claim 36, wherein said first subassembly includes attaching means for fixedly attaching an end of said cable associated with said throttle lever of said one engine to said mounting block.

* * * * *

UNITED STATES PATENT AND TRADEMARK OFFICE
CERTIFICATE OF CORRECTION

PATENT NO. : 4,586,341

DATED : May 6, 1986

INVENTOR(S) : John R. Kobus

It is certified that error appears in the above-identified patent and that said Letters Patent is hereby corrected as shown below:

```
Claim 7, line 18, after "direction" insert --opposite to
          said first rotational direction"
Claim 18, line 15, "subsassembly" should read --subassembly--.
Claim 21, line 39, "to" should read --on--.
```

Signed and Sealed this

Seventh Day of October, 1986

[SEAL]

Attest:

DONALD J. QUIGG

Attesting Officer

Commissioner of Patents and Trademarks